2,787,574

SUBSTITUTED PHENYL UREA COMPOSITIONS FOR TREATING COCCIDIOSIS

Robert C. O'Neill, New York, N. Y., and Arthur J. Basso, Rahway, N. J., assignors to Merck & Co., Inc., Rahway, N. J., a corporation of New Jersey No Drawing. Application March 11, 1953, Serial No. 341,821

7 Claims. (Cl. 167—53.1)

This invention relates to the treatment of coccidiosis. More particularly, it is concerned with novel compositions useful in the treatment of coccidiosis which contain phenylureas as the active ingredient. It is also concerned with the preparation of new phenylureas useful in such compositions.

The widespread disease complex commonly called "coccidiosis" is caused by several species of protozoan parasites of the genus Eimeria. Thus the species E. tenella is responsible for a severe and frequently fatal infection in the cecum, or blind gut, of chickens. Furthermore, other species of Eimeria and particularly E. acervulina, E. necatrix, E. maxima, and E. brunetti cause serious intestinal infections in poultry. When left untreated coccidiosis causes extensive losses to poultry and animal raisers regardless of geographical location. Accordingly, the control of coccidiosis is essential to successful animal husbandry.

Therefore one object of this invention is to prevent the spread and development of coccidiosis. Another object is to provide novel compositions which can be used to control coccidiosis and methods for preparing such compositions. It is also an object to provide new derivatives of phenylurea which are active against coccidiosis.

According to one embodiment of the present invention novel compositions are provided which are useful against coccidiosis. It has been found that compositions comprising an active ingredient selected from the group consisting of 3-nitrophenylurea, 1,3 bis (4-nitrophenyl) urea, and phenylureas of the formula

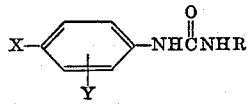

wherein X represents a halo, cyano, or nitro radical, Y represents a hydrogen, alkyl, alkoxy, halo or nitro radical, and R represents a hydrogen or lower alkyl radical, combined with an inert carrier are active against coccidiosis. The coccidiostatic activity of representative compounds belonging to the described group was experimentally demonstrated according to the following test:

Groups of 10 two-week old chicks were placed on a diet of mash feed containing from 0.0125 to 0.1% of the phenylurea to be tested. Each chick was then inoculated with 50,000 oocysts 24 hours after administration of the drug began. Control groups of ten chicks were also infected but fed a normal, non-medicated diet. After the diets were administered for eight days the test was terminated, the survivors sacrificed, and the oocyst count determined. The following results were obtained from this test.

| Compound | Percent of Diet | Percent Mortality | | Number of Oocysts × $10^6$ In Surviving Animals | |
|---|---|---|---|---|---|
| | | Treated | Untreated | Treated | Untreated |
| 1. 4-chlorophenylurea | 0.0125 | 0 | 35 | 9.2 | 19.2 |
| | 0.025 | 10 | 35 | 0.1 | 19.2 |
| | 0.05 | 0 | 35 | 0.2 | 19.2 |
| 2. 4-bromophenylurea | 0.025 | 0 | 50 | 2.9 | 10.6 |
| | 0.05 | 0 | 50 | 0.7 | 10.6 |
| | 0.1 | 10 | 10 | 0.2 | 11.7 |
| 3. 4-iodophenylurea | 0.025 | 0 | 35 | 1.9 | 14.5 |
| | 0.05 | 10 | 35 | 0.2 | 14.5 |
| | 0.1 | 0 | 20 | 0.1 | 27.3 |
| 4. 4-fluorophenylurea | 0.1 | 0 | 35 | 1.7 | 14.5 |
| 5. 2-nitro-4-chlorophenylurea | 0.1 | 0 | 50 | 5.4 | 24.4 |
| | 0.025 | 20 | 40 | 4.8 | 24.4 |
| 6. 2,4-dichlorophenylurea | 0.05 | 0 | 40 | 1.8 | 24.4 |
| | 0.1 | 0 | 40 | 0.6 | 24.4 |
| | 0.0125 | 10 | 50 | 4.8 | 10.4 |
| | 0.025 | 0 | 50 | 2.6 | 10.4 |
| 7. 4-cyanophenylurea | 0.05 | 0 | 50 | 0.6 | 10.4 |
| | 0.1 | 0 | 35 | <0.1 | 16.3 |
| | 0.025 | 0 | 10 | 2.2 | 11.7 |
| 8. 4-nitrophenylurea | 0.05 | 0 | 50 | 1.5 | 10.6 |
| | 0.1 | 0 | 20 | 0.1 | 23.5 |
| 9. 2-methoxy-4-nitrophenylurea | 0.025 | 0 | 35 | 2.5 | 19.2 |
| | 0.05 | 0 | 35 | 0.2 | 10.2 |
| | 0.1 | 0 | 50 | 0.2 | 10.6 |
| 10. 1-methyl-3-(4-nitrophenyl) urea | 0.05 | 0 | 35 | <0.1 | 14.5 |
| | 0.1 | 0 | 20 | 0.7 | 27.3 |
| 11. 1-isopropyl-3-(4-nitrophenyl) urea | 0.025 | 10 | 35 | 1.6 | 14.5 |
| | 0.05 | 0 | 35 | <0.1 | 14.5 |
| | 0.1 | 0 | 20 | <0.1 | 27.3 |
| 12. 1-isopropyl-3-(4-chlorophenyl) urea | 0.1 | 0 | 50 | 11.0 | 24.4 |
| 13. 3-nitrophenylurea | 0.1 | 0 | 35 | <0.1 | 19.2 |
| 14. 1,3-bis (4-nitrophenyl) urea | 0.05 | 10 | 50 | 0.4 | 6.6 |
| | 0.1 | 0 | 45 | 0.2 | 7.8 |

These results clearly indicate that 3-nitrophenylurea, 1,3 bis (4-nitrophenyl) urea, and phenylureas substituted in the 4 position with a halo, cyano, or nitro radical are potent coccidiostats capable of substantially lowering, and even completely preventing, deaths due to the disease while at the same time greatly reducing or destroying the infection.

Although other ureas and in particular other phenylureas, might be expected to be active coccidiostats this has not been found to be the case. For example, urea, methylurea, phenylurea, and phenylureas substituted in the 4 position with other than halo, cyano and nitro groups, and specifically 4-methoxy, 4-hydroxy, 4-amino, 4-acetamino and 4-methyl phenylureas were all found to be ineffective against coccidiosis. In addition, it was surprising to find position isomers of substituted halo, nitro, and cyano phenylureas such as 2-nitrophenylurea, 2-chlorophenylurea, and 3-chlorophenylurea to be inactive against coccidiosis with the single exception of the 3-nitrophenylurea isomer which is highly active.

The novel compositions of this invention are produced by intimately dispersing one or more of the active phenylureas in an inert carrier that is tolerated by animals and poultry. The carrier can be either a solid or a liquid. Those phenylureas which are sufficiently soluble in water to permit administration of an effective amount of drug may be supplied to the animals in the drinking water. However, most of the active phenylureas are not sufficiently soluble to allow administration by this method. Nevertheless, dispersions can be prepared by the use of other materials such as emulsifiers and surface active agents. In general though, it is preferred to use a solid carrier to avoid the difficulties normally encountered when suspending insoluble materials. Many different solid materials will function as suitable carriers but those which are inexpensive and readily available are preferred. Some such suitable carriers are ground oyster shells, attapulgus clay, distillers dried grains, and edible vegetable substances such as commercial animal and poultry feeds.

Uniform dispersion of the drug throughout a solid carrier can be readily effected by the usual methods of grinding, stirring, and mixing. By altering the amount of drug added, and the carried used, compositions of varying concentration can be custom made to suit any purpose.

With particular regard to coccidiosis in poultry, it has been found highly satisfactory to administer the drug incorporated in the normal diet. According to this method of administration, coccidiosis in poultry can be effectively treated when the birds are placed on a diet containing no more than 0.1%, and as little as 0.0125%, of the active phenylureas. However, larger amounts of drug may be administered to control extremely virulent outbreaks of the disease. Not noly may such compositions be used therapeutically to treat infected poultry but they may also be used prophylactically to prevent infection.

Compositions useful in the treatment of coccidiosis may also be prepared containing, in addition to at least one of the active nuclear substituted phenylureas combined with a suitable carrier, other coccidiostats which are presently available such as sulfaquinoxaline, 3,3'-dinitrodiphenyldisulfide, arsenicals, and combinations of the ordinary therapeutically useful sulfa drugs One such composition suitable for use in the control of coccidiosis in poultry comprises 0.05% of 4-chlorophenylurea and 0.05% of sulfaquinoxaline combined with a feedstuff.

1,3 bis (4-nitrophenyl) urea is a known compound and may be prepared by procedures in the literature. The other active phenylureas used in the compositions of this invention can be prepared by reacting an aqueous solution of potassium cyanate with an appropriately substituted phenylamine in the presence of a dilute acid such as a mineral acid or acetic acid. The resulting phenylurea may be easily recovered from the reaction mixture by filtration. If desired, the phenylureas can be prepared by an alternative method which, however, is especially useful for the preparation of 1-alkyl-3-(4-substituted phenyl) ureas. This process comprises reacting the appropriately substituted phenyl isocyanate with an alkyl amine, or ammonia, in the presence of an anhydrous inert solvent such as carbon tetrachloride or dioxane.

Also pursuant to the present invention three new active phenylureas were produced. These compounds are 4-fluorophenylurea, 2-methoxy-4-nitrophenylurea, and 1-isopropyl-3-(4-nitrophenyl) urea. 4-fluorophenylurea is produced by reacting 4-fluoroaniline with an alkali metal or alkaline earth metal cyanate, preferably potassium cyanate, in dilute acid solution. The desired product is recovered by filtration. In a similar manner 2-methoxy-4-nitrophenylurea is prepared by reacting 2-methoxy-4-nitroaniline with a cyanate salt in acid. 1-isopropyl-3-(4-nitrophenyl) urea is prepared by reacting 4-nitrophenylisocyanate with isopropylamine in a suitable inert solvent.

The following examples illustrate specific methods for the preparation of these active phenylureas.

EXAMPLE 1

Production of 4-fluorophenylurea 9.4 grams of crude 4-fluoroaniline was dissolved in about 35 ml. of 2.5 N hydrochloric acid. Charcoal was added, the solution warmed, and then filtered. Then 9.9 gm. of potassium cyanate in 20 ml. of water at room temperature was added to the solution. The reaction mixture was stirred, allowed to cool and a pale yellow solid recovered by filtration. It was recrystallized from a mixture of 30 ml. of water and 5 ml. of ethanol to give pale yellow crystals of 4-fluorophenylurea which melted at 178–180° C.

EXAMPLE 2

Production of 2-methoxy-4-nitrophenylurea

Thirty gm. of 2-methoxy-4-nitroaniline was dissolved in 380 ml. of glacial acetic acid at 60° C. To this solution was added 29 gm. of potassium isocyanate over a 15 minute period. The reaction mixture was heated to 71° C. for 10 minutes, charcoaled, and filtered under diminished pressure. The solution was then poured into 1200 ml. of water with vigorous stirring and a yellow solid deposited. The 2-methoxy-4-nitrophenylurea was filtered off and dried. It melted at 188–193° C.

EXAMPLE 3

Production of 1-isopropyl-3-(4-nitrophenyl) urea

Twenty ml. of isopropylamine was added to 20.8 gm. of 4-nitrophenylisocyanate in 250 ml. of dry carbon tetrachloride. The reaction ensued immediately and a pale yellow solid precipitated. After standing at room temperature for a few minutes the 1-isopropyl-3-(4-nitrophenyl) urea was filtered off and dried. It was recrystallized from ethanol in the form of yellow needles. It melted at 192–193° C.

EXAMPLE 4

Production of 1-methyl-3-(4-nitrophenyl) urea

A stream of dry gaseous methylamine was vigorously bubbled into a solution of 18.6 gm. of 4-nitrophenylisocyanate in 250 ml. of dry carbon tetrachloride until the mixture became strongly basic. During the reaction the temperature rose steadily and large quantities of yellow solid deposited immediately. After standing for two and one-half hours at room temperature the 1-methyl-3-(4-nitrophenyl) urea was separated by filtration and dried. It had a melting point of 245–247° C.

What is claimed is:

1. A composition useful against coccidiosis which comprises a member selected from the group consisting of 3-nitrophenylurea, and phenylureas of the formula

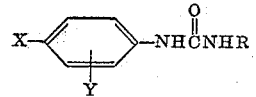

wherein X represents a member selected from the class consisting of halo, cyano and nitro radicals, Y represents a member selected from the class consisting of hydrogen, lower alkyl, lower alkoxy, halo and nitro radicals, and R represents a member selected from the class consisting of hydrogen and lower alkyl radicals, intimately dispersed in an animal feedstuff.

2. A composition useful against coccidiosis which comprises 4-chlorophenylurea combined with an animal feedstuff.

3. A composition useful against coccidiosis which comprises 4-nitrophenylurea combined with an animal feedstuff.

4. A composition useful against coccidiosis which comprises 4-cyanophenylurea combined with an animal feedstuff.

5. A composition useful against coccidiosis which comprises 1-isopropyl-3-(4-nitrophenyl) urea combined with an animal feedstuff.

6. A composition useful against coccidiosis which comprises 3-nitrophenylurea combined with an animal feedstuff.

7. A composition useful against coccidiosis which comprises sulfaquinoxaline and a member selected from the group consisting of 3-nitrophenylurea, and phenylureas of the formula

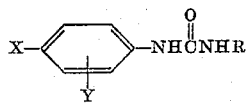

wherein X represents a member selected from the class consisting of halo, cyano and nitro radicals, Y represents a member selected from the class consisting of hydrogen, lower alkyl, lower alkoxy, halo and nitro radicals, and R represents a member selected from the class consisting of hydrogen and lower alkyl radicals, intimately dispersed in an animal feedstuff.

References Cited in the file of this patent

UNITED STATES PATENTS 2,566,066    Martin _____ Aug. 28, 1951

OTHER REFERENCES

Beilstein, Vierte Auflage, vol. 12, page 723 (1929).
Dyson et al.: J. Indian Chem. Soc. 8, 147–180 (1931) (see Chemical Abstracts, 25 48815, 1931).
Backer et al.: Rec. Trav. Chem. 69, 1323–1347 (1950).
Bovin et al.: Can. J. Chem. 29, 478–481 (1951).